(12) United States Patent
Anderson

(10) Patent No.: US 6,279,010 B1
(45) Date of Patent: Aug. 21, 2001

(54) METHOD AND APPARATUS FOR FORENSIC ANALYSIS OF INFORMATION STORED IN COMPUTER-READABLE MEDIA

(75) Inventor: Michael R. Anderson, Gresham, OR (US)

(73) Assignee: New Technologies Armor, Inc., Gresham, OR (US)

( * ) Notice: Subject to any disclaimer, the term of this patent is extended or adjusted under 35 U.S.C. 154(b) by 0 days.

(21) Appl. No.: 09/228,700

(22) Filed: Jan. 12, 1999

Related U.S. Application Data

(60) Provisional application No. 60/093,353, filed on Jul. 20, 1998.

(51) Int. Cl.[7] ................................................. G06F 5/00
(52) U.S. Cl. ................................. 707/202; 713/165
(58) Field of Search ..................... 707/1–10, 100–102, 707/200–206, 500, 513, 524, 526; 711/1–6, 100–173, 200, 202; 360/1, 4–5, 53, 97.01; 369/13–15; 713/1–2, 100, 152, 154–155, 161, 165–171, 176, 200–201; 714/100, 2, 6, 15

(56) References Cited

U.S. PATENT DOCUMENTS

| | | | |
|---|---|---|---|
| 5,668,897 | * | 9/1997 | Stolfo ................................. 382/283 |
| 5,832,526 | * | 11/1998 | Schuyler ............................ 707/205 |
| 5,903,753 | * | 5/1999 | Bramnick et al. .................. 709/328 |

* cited by examiner

Primary Examiner—Hosain T. Alam
Assistant Examiner—Alford W. Kindred
(74) Attorney, Agent, or Firm—Michael O. Scheinberg

(57) ABSTRACT

Ambient data is data created or retained as an artifact of a computer system, rather than by an intention of the user. Ambient data typically includes both textual and binary, i.e., non-textual, data. Ambient data can include information of which the user is unaware, and an investigator can review ambient data to learn about the Internet-related activity performed on the computer. Most of the information in the ambient data is not useful, and the large amount of ambient data on a typical computer system can require significant time to review. The invention locates useful internet-related information in the ambient data and outputs the information in a useful database format, excluding non-textual data and text that is unrelated to Internet activity. The system locates internet-related information of interest using proximity rules, that is, the system writes output when only when certain characters appear in the ambient data within a specified proximity to other characters. The characters can include including symbols, abbreviations, or words, specified either individually or on a pre-compiled list. Exclusionary rules can also eliminate firewall aliases, internet identifiers that are less useful to an investigator. By applying such rules, an output file including only textual data representing useful Internet addresses and URL is presented to an investigator.

22 Claims, 8 Drawing Sheets

METHOD AND APPARATUS FOR FORENSIC ANALYSIS OF INFORMATION STORED IN COMPUTER-READABLE MEDIA

RELATED APPLICATIONS:

This application claims priority under U.S. Title 35 §119 from provisional application No. 60/093,353, filed Jul. 20, 1998, in the United States.

BACKGROUND OF THE INVENTION

This invention relates to a forensic tool for use in retrieval and analysis of evidence stored in computer readable media.

In recent years, personal computers have become a major part of every day life. They are used for e-mail, to run word processing programs, to analyze numbers, and as tools that can aid in the completion of almost any task. They have become common place and are used in business as well as effective tools for use in the home. The migration to personal computers has not been limited unfortunately to honest individuals. Computers have also become tools that are used by criminals to perform any number of tasks. As a result, law enforcement agencies have found it necessary to become more and more familiar with computers and related evidence. Because computer data is stored magnetically and on a variety of storage mediums, computer evidence processing has evolved as a forensic science. Almost all major law enforcement agencies and all military agencies in the United States have developed computer crime units.

As a results of the increased use of personal computers, documentary evidence has transformed during the past several years from paper documents to computer data stored on floppy diskettes, computer hard disk drives, zip® disks, jaz® disks and read/writable CD ROMS. These high technology, high capacity storage devices have the potential to store the equivalent of thousands or even hundreds of thousands of printed pages. Additionally, the nature of computer technology has created multiple data storage layers in which potential computer evidence resides in a transitory state.

The existence of much of the data contained on a computer hard disk drive is unknown to the computer user whose work session created the data. As a result, such data has the potential of providing useful information for investigators, internal auditors and others who have an interest in computer evidence issues. Such incidental data, which exists on a storage media as an artifact of the system, rather than by an intent of the user, is referred to as "ambient data." The term "ambient data" is used below to refer to any large data object of mixed binary and textual content. The information in the ambient data may provide a truer picture of the computer use that the information which the user is aware and can easily modify. The investigator can use leads gleaned from the ambient data to search the data in allocated file space.

Primarily these levels of data storage deal with data that is contained in files, previously erased files (or fragments of such files) and file slack (defined below). Regarding data created by the Microsoft Windows operating environment, relevant data or data fragments potentially exist in what is known as the Windows swap file. Each of these ambient data sources of evidence is discussed in more detail below.

File Slack

Computer storage media is typically divided up into storage units called sectors. Each sectors typically contains 512 bytes of data For efficiency in managing large storage media, most computer operating systems group one or more sectors into a larger unit, known as an allocation unit or cluster, and allocate an integral number of clusters to each file. The cluster size is determined by the version of DOS or Windows involved as well as the type of hard disk, floppy diskette or storage media involved.

File Slack or slack space is the area between the end of the file and the end of the last cluster that the operating system has assigned to the file. This area is automatically filled with random data from the computer memory by the operating system. File slack may contain information that the computer user believes has been removed from the computer. There will always be some file slack in the last cluster of a file unless, coincidentally, the file size exactly matches the size of one or more clusters. In such rare cases, no file slack will exist at all. File slack is not part of the actual file. The computer user, therefore, does not usually know about the existence of this storage area and has no ability to evaluate the content without specialized forensic software tools. Such tools typically use the file allocation table and directory to compare the true file size with the space allocated to the file to determine the location and size of the file slack. Information found in file slack is useful in internal audits and computer security reviews.

When DOS (or Windows) closes a file, after either creating or updating it, the computer automatically writes one or more clusters to disk. The file slack is created at this time and random data is dumped from the memory of the computer into file slack (the space from the end of the file to the end of the last cluster assigned to the file). By way of example, the storage of data on a computer hard disk drive typically involves cluster sizes that are larger than cluster sizes associated with data stored on floppy diskettes or zip drives. As a result, file slack can potentially be as large as 32,000 bytes. The random data written to file slack can contain almost anything including e-mail messages, passwords, network logons, etc.

Typically the cluster size is one or two sectors regarding files stored on floppy diskettes and this is dependent upon the storage capacity of the diskette involved. In the case of file slack created on large computer hard disk drives, potentially 25% of the hard disk drive's storage capacity can be occupied by file slack on a 'seasoned' computer hard disk drive. The reason for this is due to the fact that modern versions of DOS/Windows assign large cluster sizes when hard disk drives are involved, e.g. 32 k clusters. Normally these huge cluster sizes occur when only one partition is involved on a high capacity computer hard disk drive.

Even when the parent file is deleted, the file slack remains as unallocated storage space until it is overwritten with the content of a new file. Essentially, memory dumps in file slack can remain for years on a floppy diskette or hard disk drive and the computer user is unaware of the existence of the data. It is interesting to note that approximately 8 printed pages of text can be stored in a 32 k cluster and depending on the size of the file involved, file slack can occupy much of this space.

Computer data is relatively fragile and is susceptible to unintentional alteration or erasure. This is especially true regarding file slack because it has some unique and interesting characteristics. As long as the file it is associated with is intact, the file slack remains intact and is relatively safe from alteration. However, if the file is copied from one location to another, the original file slack remains with the original file and new file slack is created and attached to the copied file. Disk defragmentation has no effect on the file slack.

Unallocated Space

When files are deleted using conventional DOS or Windows commands or are automatically deleted by programs such as word processing applications, the data associated with the file is not actually deleted. Although the directory listing of a deleted file is removed and the file allocation table is changed to reflect that the space previously occupied by the file is free, the data itself remains on the computer hard disk drive or floppy diskette until it is eventually overwritten with data from new files. However, the normal process of overwriting previously deleted files can take a long time depending on the size of the storage device involved and the frequency of use. The large volume of stored data associated with previously erased files can contain much information of interest to an investigator. The unallocated space will also contain the file slack that was previously associated with the deleted files.

Windows Swap Files

Windows Swap files are a significant source of potential computer evidence when Windows, Windows for Workgroups, Windows 95 and/or Windows NT operating systems are involved. These files are huge and normally consist of several million bytes of 'raw' computer data. Essentially, the Windows Swap file acts as a buffer for use by the operating system as it runs programs, etc. Depending on the version of Windows and the user configuration involved, the files are created dynamically or they are static. Dynamic swap files are automatically created at the beginning of the work session by the operating system and are erased upon termination of the work session by the user. Although a dynamic file is deleted at the end of the Windows sessions, any data from the swap file is available in the unallocated disk space.

Static swap files are created at the option of the user during the initial work session and remain on the disk after the work session is terminated. The user can configure the system for either type of swap file at their option during system configuration. The size of a typical Windows Swap file can be about 100 megabytes. Because the Windows Swap file acts as a buffer for the operating system, much sensitive information passes through it. Some of the information remains behind in the file when the session is terminated. As a result, this file holds the potential for containing a great deal of useful information for the investigator and/or internal auditor. However, the large file size makes reviewing the swap file extremely time consuming. Evaluation of the content of a swap file typically took several hours or even days.

Temporary Files

Windows and other programs create temporary files that can remain after a computing session and contain data valuable to an investigator. Such files typically have a file extension of .tmp and many are found in the Windows or Windows/system directories.

"Bad" Clusters

The ambient data can be information in sectors that are indicated as unusable in the file allocation table. Most operating systems will indicate that an entire cluster is "bad" or unusable if any part of the cluster is unusable. Some of the sectors that comprise the cluster may still contain valid data, that could information useful to an investigator.

.Dat Files

Windows creates .DAT files, primarily in the Windows directory and subdirectories thereof, that are also a source of ambient data. Other programs also create such file.

Data contained in file slack, unallocated space (erased files), temporary files, .dat files, and the Windows swap file usually contains a significant amount of non-ASCII data which cannot be viewed or printed using conventional, text-viewing software applications, e.g., a word processing application, the DOS Edit program, the Windows Write program, etc. Such data is commonly referred to as binary data and some of the bytes involved may mistakenly be interpreted by standard application programs to be control characters, e.g. line feed, carriage return, form feed, etc. The equivalent of hundreds or even thousands of printed pages of data can be stored in this form on a standard computer hard disk drive. The viewing or printing of such data can prove to be a challenge for the computer investigator without proper forensic software tools. The evaluation and processing of binary data was a tedious and time consuming task. Using conventional forensic processes, the evaluation of file slack, unallocated space and the Windows swap file can be measured in days or even weeks. By way of example, a typical Windows Swap file consists of hundreds of millions of bytes of data. It can take several days to properly analyze just one of these files using conventional means.

New Technologies, Inc., the assignee of the present invention, provides tools to law enforcement agencies, corporations, and government agencies that capture the ambient data from file slack and unallocated space and remove much of the binary data from it. There still remains, however, an enormous amount of information that can take an investigator many hours to review. Thus, it has been impossible for an investigator to investigate many computers in a short period of time, as may be necessary, for example, in an organization having many computers that must be checked for evidence with minimal disruption of the work environment.

SUMMARY OF THE INVENTION

In accordance with the invention, a tool is provided that permits an investigator, auditor, or security specialist to quickly review large quantities of information that is stored in ambient data on a computer.

Accordingly, it is an object of the present invention to provide a method to permit an investigator to quickly review large quantities of information that are stored in ambient data on computer-readable media.

It is a further object of the present invention to provide a method that allows an investigator to quickly find names, keyboard input, English language sentences, e-mail addresses, and Internet universal resource locators (URLs) in ambient data on computer readable media.

It is still another object of the invention to provide a method using character pattern recognition including inclusionary and exclusionary rules to distill potentially useful investigatory leads from large amounts of ambient data by eliminating information unlikely to be useful.

It is yet a further object of the invention to provide a method for chronicling use of one or more computers.

It is yet another object of the invention to provide a method of removing sensitive information in ambient data from a computer-readable storage medium.

The invention provides a method of quickly and automatically evaluating information in ambient data on computer readable media. The invention presents an investigator a greatly reduced amount of information in which useful investigative leads are concentrated. The invention performs, in effect, an intelligent compression of a large amount of mostly uninteresting data into a much smaller amount of useful information. Rather than merely being a text search engine, the invention excludes data huge amounts of the ambient data from its output by eliminating the majority of information that is unlikely to be of interest to the investigator.

The ambient data is preferably copied to a second computer for analysis to preserve the ambient data on the original media. The non-textual, binary data is removed, and the remaining data is automatically, intelligently analyzed. The analysis seeks patterns in the characters in the ambient data files. The existence of particular patterns in the characters indicates that the characters contain information of a particular type.

The rules for defining patterns include testing for the sequence and proximity of character types, specific characters, or groups of characters, including specific words, names, and abbreviations. Rules can be inclusory or exclusory. The investigator can specify the type of information he is seeking and, by eliminating text that does not fit the patterns associated with the type of information being sought, the output presented to an investigator is greatly reduced in size and includes a high concentration of useful investigative information.

For example, certain patterns of vowels, consonants, numbers, and punctuation are likely to indicate the presence of keyboard input, which may correspond to, for example, passwords. English words typically correspond to a small number of patterns of vowels and consonants and are thereby recognizable. Certain groupings of number represent different types of information, such as social security numbers or telephone numbers. Certain other combinations of vowels and consonants represent keyboard input, but not English language words.

Other patterns represent the presence of English language sentence structure. For example, when the presence of certain punctuation marks are detected, characters in the immediate vicinity can be compared to a word list to determine whether the data includes English language sentences that may be of interest to an investigator.

Another type of pattern represents Internet e-mail addresses and universal resource locators (URLs). Many Internet servers maintain a "firewall" between its data and the Internet to increases the security of information on their Internet server. The firewall assigns alias to individuals behind the firewall, and such aliases are of less use to an investigator than an actual e-mail address that can be associated with an individual or a specific account. The pattern of characters in a firewall alias are typically different from that in a normal e-mail address. By analyzing the patterns in the ambient data, it is possible to identify e-mail addresses that are not firewall aliases and present an investigator only with e-mail addresses and URLs that are likely to have a high concentration of investigative leads.

Another type of character pattern represents names. The invention recognizes first names and nicknames, and then captures data surrounding the first name or nickname to obtain possible complete names.

Another type of character pattern represents certain types of files downloaded from the Internet. Such files include graphics files, such as GIF, .JPG, and .BMP files, that may contain inappropriate or illegal content and compressed (zipped) files that can contain hidden data. Such files can be recognized by finding particular punctuation and file designations in a particular order and proximity, and then reviewing the characters for the presence of specified words that indicate content of interest.

Other detectable patterns include telephone numbers, social security numbers. The analysis can also include testing not only for the presence, but also of the order and proximity of characters or groups of characters.

In one preferred embodiment, after binary data is removed from the file, different types of character, such as vowels, consonants, letters, numbers, punctuation marks, and certain symbols, are replaced with symbols, such as "C" for consonants, "V" for vowels, etc. The order of the symbols representing the types of characters are analyzed to determine what the pattern is likely to represent. Content that may be of interest is written to an output file, optionally annotated to indicate why it may be interest.

The invention can be used to identify Internet items. The analysis process can be reduced to minutes and much in the way of Internet activity is stored in the Windows swap file. The same is true of the analysis of file slack and erased file space.

The output of the analysis can be written into a file in a suitable form. For example, if English language text is sought, the output may be written into a text file. A database file format may be more useful as output of other analysis, such as for a list of e-mail addresses, URLs, or names of file and associated times and/or date.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a method and system for of collecting and analyzing ambient data.

Figure 1:
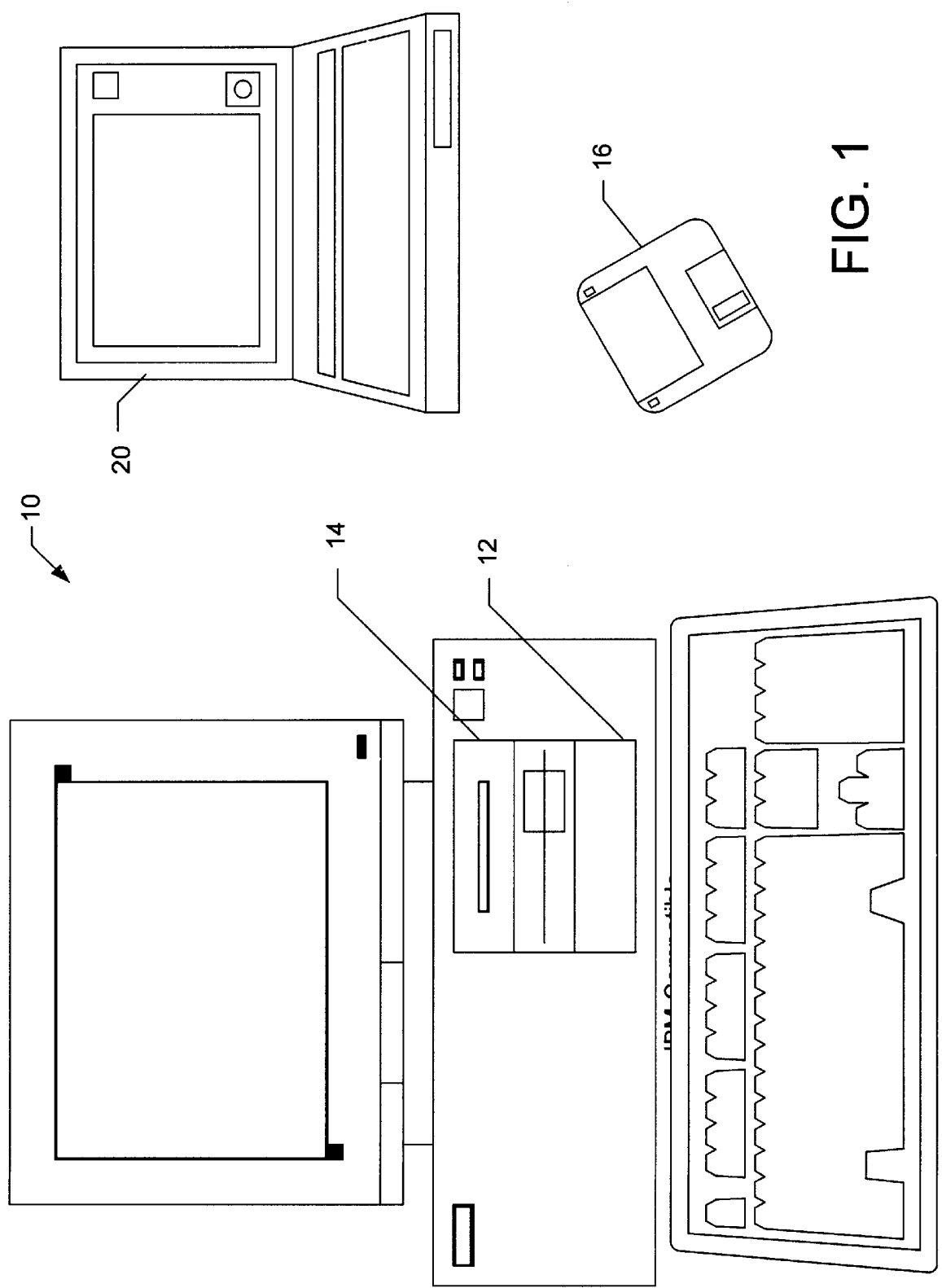
FIG. 1 shows a personal typical computer system having a hard disk data storage media and a floppy disk drive that can be checked for evidence using the present invention.

FIG. 1 shows a typical personal computer system 10 having a hard disk data storage media 12 and a floppy disk drive 14 for storing information upon floppy disks such as floppy disk 16. FIG. 1 also shows a laptop computer 20 to which information from computer 10 can be copied and then analyzed. The present invention is not limited to any type of storage media and can be used to analyze data on other storage media, including zip disks, jaz disks, and media that may be used in the future.

Figure 2:
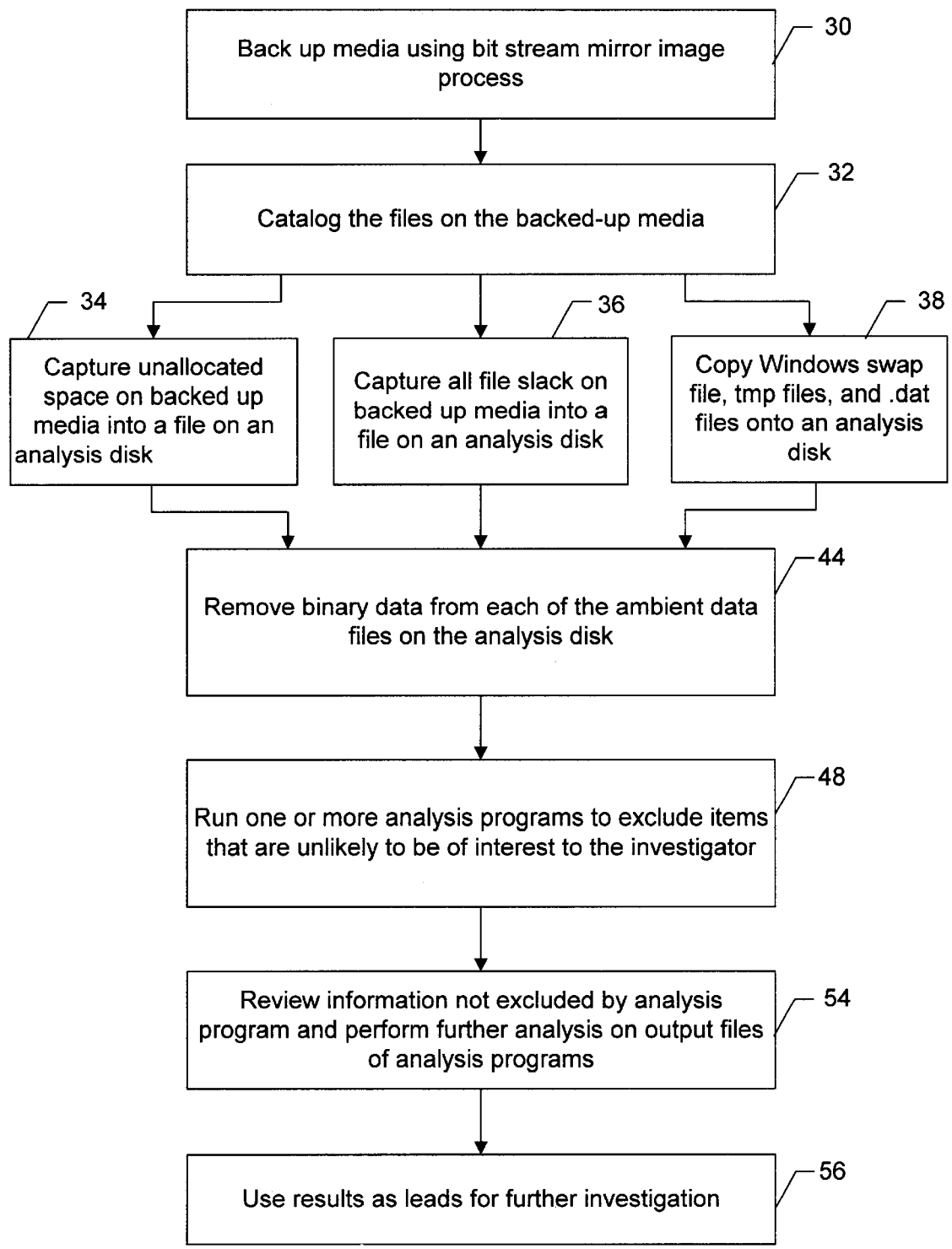
FIG. 2 is a flowchart showing the general steps for collecting and analyzing data using the present invention.

FIG. 2 shows a preferred method of collecting and processing ambient data for analysis. Of course, the methods of present invention can be applied to ambient, i.e., any large compilation of binary and text data, regardless of the source of the data or how the data is collected and prepared for analyze. Step 30 shows that the storage media of interest, such as, hard disk 12 of a computer 10 or a removable media, such as floppy disk 16, a zip disk, a jaz disk, or writable CD ROM drive are backed up and stored on second computer 20 or second drive. The data to be analyzed are preferably copied from the computer or media under investigation using any commercially available bit stream mirror image copy program, such as SafeBack by Sydex, Inc. of Eugene, Oreg. If the data to be analyzed is on a floppy disk, the DOS utility DISKCOPY can be used.

The file is copied from computer 10 to preserve the data on the original media. Adding any information to hard disk 12 of the computer 10 being investigated can destroy potentially useful information stored in unallocated space on the hard disk. Using Windows on the computer under investigation can change the contents of a static Windows swap file or the unallocated space from the dynamic swap file and temporary files, any of which may contain evidence.

Step 32 shows that the copy of the back-up drive is preferably cataloged to record the files on the disk, and when each was created and last modified. The cataloging can be performed using a forensic utility such as FileList, available from New Technologies, Inc., which converts the output to a database of compressed data. The FileList program captures all the useful information about the file that is available from the directory, including long file names, creation time and date, access times and dates, and modification times and dates and stores the information in a compressed form.

The compressed output of FileList can fit on a floppy disk, so the program can be run quickly and covertly on multiple computers under investigation without removing the computers to a laboratory. The output of the FileList program is then decompressed and preferably written into a database format. The computer file activity can then be sorted and analyzed using standard database or spreadsheet programs to provide a chronological record of usage of one or more computers and files on one or more floppy or hard disks.

Step 34 shows that the unallocated space on the backed up media is captured onto a different media for analysis. The unallocated space can be captured into a binary file object using, for example, a forensic utility such as GetFree available from New Technologies, Inc. Similarly, step 36 shows the file slack is captured into a binary file object on the analysis media using a forensic utility such as GetSlack available from New Technologies, Inc.

Step 38 shows that other ambient data that is already in the form of a file object is copied to the analysis drive. Such files include Windows static swap files and other system or application generated files, such as .tmp file and .dat file. Although FIG. 2 shows that each source of ambient data is obtain, prepared, and analyzed separately, the entire content of the drive back-up of step 30, which represents a mixture of binary and text characters, could be analyzed as a single block of data.

Step 44 shows that the binary data is removed from each of the ambient data files. Step 48 shows that the ambient data is evaluated in accordance with one or more methods that are described in detail below. The analysis programs exclude items that are unlikely to be of interest to the inventor. The analysis methods quickly and automatically evaluates data in the ambient data files and presents an investigator a greatly reduced amount of information in which useful investigative leads are concentrated. The investigator can specify the information he is seeking, and the program will apply pattern analysis, including exclusionary rules, to identify information of the type requested, and only information of that type is written to an output file. By excluding information that is not of interest to the investigator, the investigator is relieved of the time consuming task of sifting through vast amounts of information.

The various analysis can be performed simultaneously during a single pass through the data, or each analysis can be performed during an individual pass through the data, or any combination thereof. The various pattern recognition methods described below in FIGS. 3–8 are illustrative of the invention. Skilled persons will recognize that other character patterns and exclusionary rules can be defined to locate other types of information, or even the same information, without departing from the principals of the present invention. An investigator may also specify that no analysis is required, and that he desires only an output file with binary data removed so that he can manually review the data.

Step 54 shows that the output of the analysis is reviewed. The output includes only the information that was not excluded by the analysis program. Depending upon the information sought, the output of the analysis may comprise, for example, a database file. The investigator may create, for example, histograms that show the relative frequencies of certain occurrences in the data. Such analysis could also be performed automatically by the analysis software. In other cases, the output may be in a simple text format. In manually reviewing the results, the investigator should consult with someone who is familiar with the case or fact pattern under investigation. In his review, the investigator should note key words or terms and search for other occurrences of those terms in the allocated file space. Thus, the ambient data of which the computer user is unaware often includes leads with regard to what information of interest may be hidden in other files on the computer.

Step 56 shows that the investigator uses the results of the analysis for leads in farther investigation. Skilled investigators will understand that the presence of a information in the ambient data comprises an investigative lead and is not conclusive proof that the computer user has intentionally loaded the information onto the computer. For example, individuals can receive unsolicited e-mail containing the URLs of inappropriate Internet sites, and members of new groups receive information distributed to the groups, which may have no relevance to the interest area of the use group.

Figure 3:
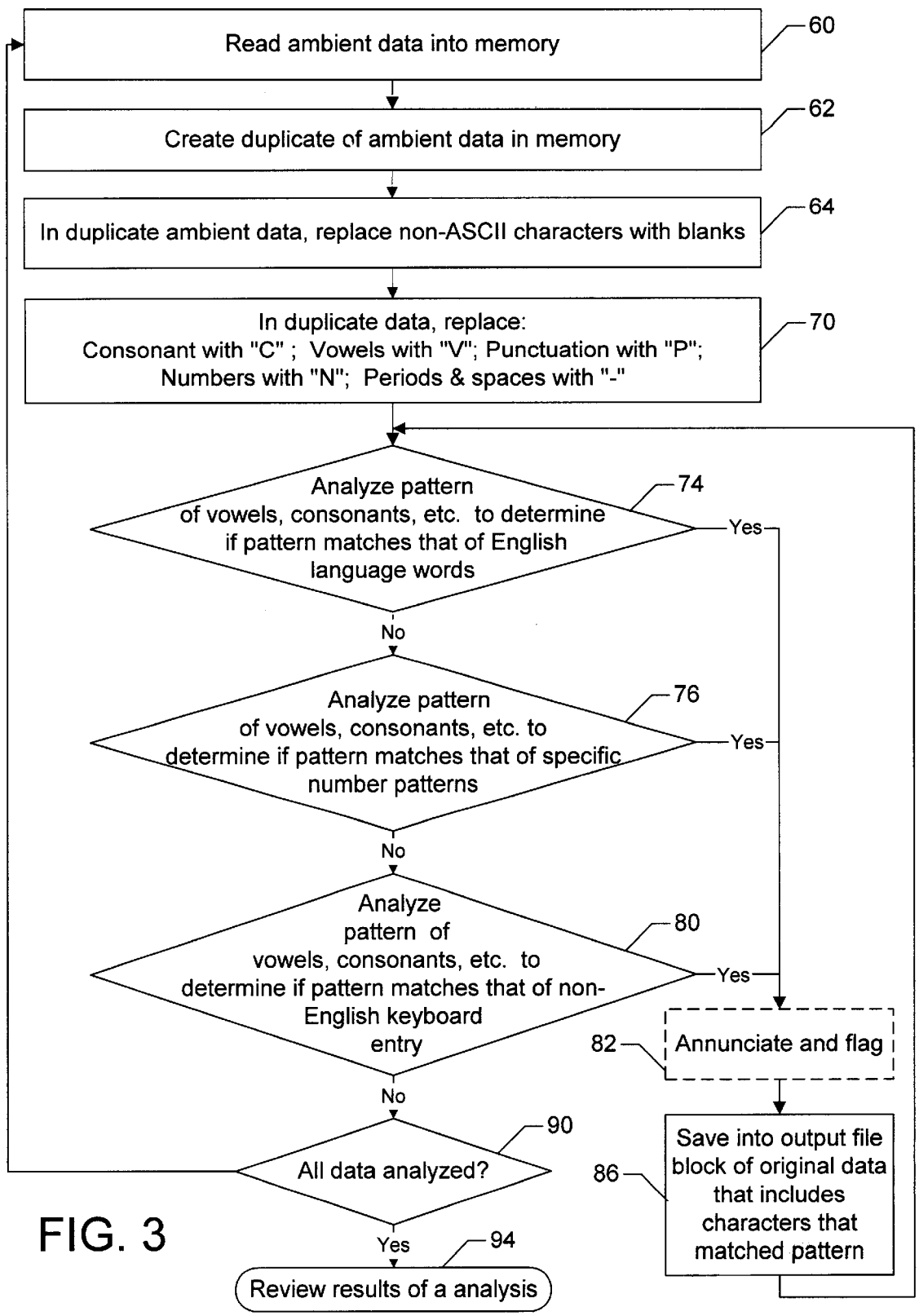
FIG. 3 is a flowchart showing the steps of a first embodiment of the present invention for finding keyboard input in ambient data.

FIG. 3 shows a first preferred embodiment of the invention as used to analyze ambient data. The ambient data file could be, for example, any of the ambient data files described above. The method shown in FIG. 3 analyzes the ambient data to locate patterns that could correspond to keyboard input that might represent logon or passwords.

Step 60 shows that ambient data is read into a first memory location. Typically, about 256 bytes are read into memory and analyzed at one time. Step 62 shows that the ambient data in the first memory location are duplicated in a second memory location. Step 64 shows that information in the second memory location is modified by replacing characters other than letters, numbers, punctuation marks, and a few commonly used symbols with blank spaces. Step 64, thus, rids the file of most of the binary data that is not intelligible to an investigator using a text viewer.

Step 70 shows that the data in the second memory location is changed again by replacing all consonants with the letter "C", all vowels with the letter "V", all punctuation and remaining symbols with "P", all numbers with "N", and all periods and spaces with "-".

Step 74 shows that the patterns of the "C"s, "V"s, "P"s, "N"s, and "-" in the second memory location are analyzed to determine whether they represent words in English or a related language. For example, groups of characters that begin with or include the following patterns of vowels and consonants are probably English language words: VCC, CVC, VCV, VVC, CVV, CCV, and CCCV. If any of these combinations is found, the location of the combination in the duplicate file is noted. The actual text from the corresponding location in the first memory area is considered likely to be an English word and is saved, along with some surrounding data, in an output file.

Step 76 shows that the patterns of the "C"s, "V"s, "P"s, "N"s, and "-"s in the second memory location are analyzed to determine whether they represent known number patterns. For example, patterns such as NNN-NNN-NNNN, NNNNNNNNNN or NN-N-NNN-NNNN are likely telephone numbers. Patterns such as NNN-NN-NNNN or NNNNNNNNN are likely social security numbers.

Step 80 shows that the patterns of the "C"s, "V"s, "P"s, "N"s, and "-"s in the second memory location are analyzed to determine whether they represent non-English language words that could be passwords or logon names entered from a key board. The following patterns are could represent such information: VPCC, CVPC, VPCV, VVPC, CPVV, CCPV, CCPCV, VNCC, CVNC, VNCV, VVNC, CNVV, CCNV, CCNCV, NNPN, or NNNN.

If any of steps 74, 76, or 80 locate characters that match the pattern sought, the "hit" is annunciated (step 82) so that the investigator is alerted to the fact that possibly useful information was found. The characters that matched the pattern, along with a predetermined amount of text before and after the hit, are written to an output file in step 86. Preferably, a total of 60 bytes is written to the output file for each hit, along with a flag to indicate which pattern the characters matched. The amount of information around the hit that is written to the output file can be varied, depending upon the investigator's preferences in the specific investigation.

After the information is written to the output, the process is continued, beginning from step 74, on the remainder of the information in memory. Step 90 shows that, after all the information in memory has been analyzed and no additional matching patterns are found, if the entire ambient data being processed has not been analyzed, additional data is read into memory in step 60, and the process is repeated. If the entire ambient data being processed has been analyzed, the investigator review the results in step 94.

Figure 4:
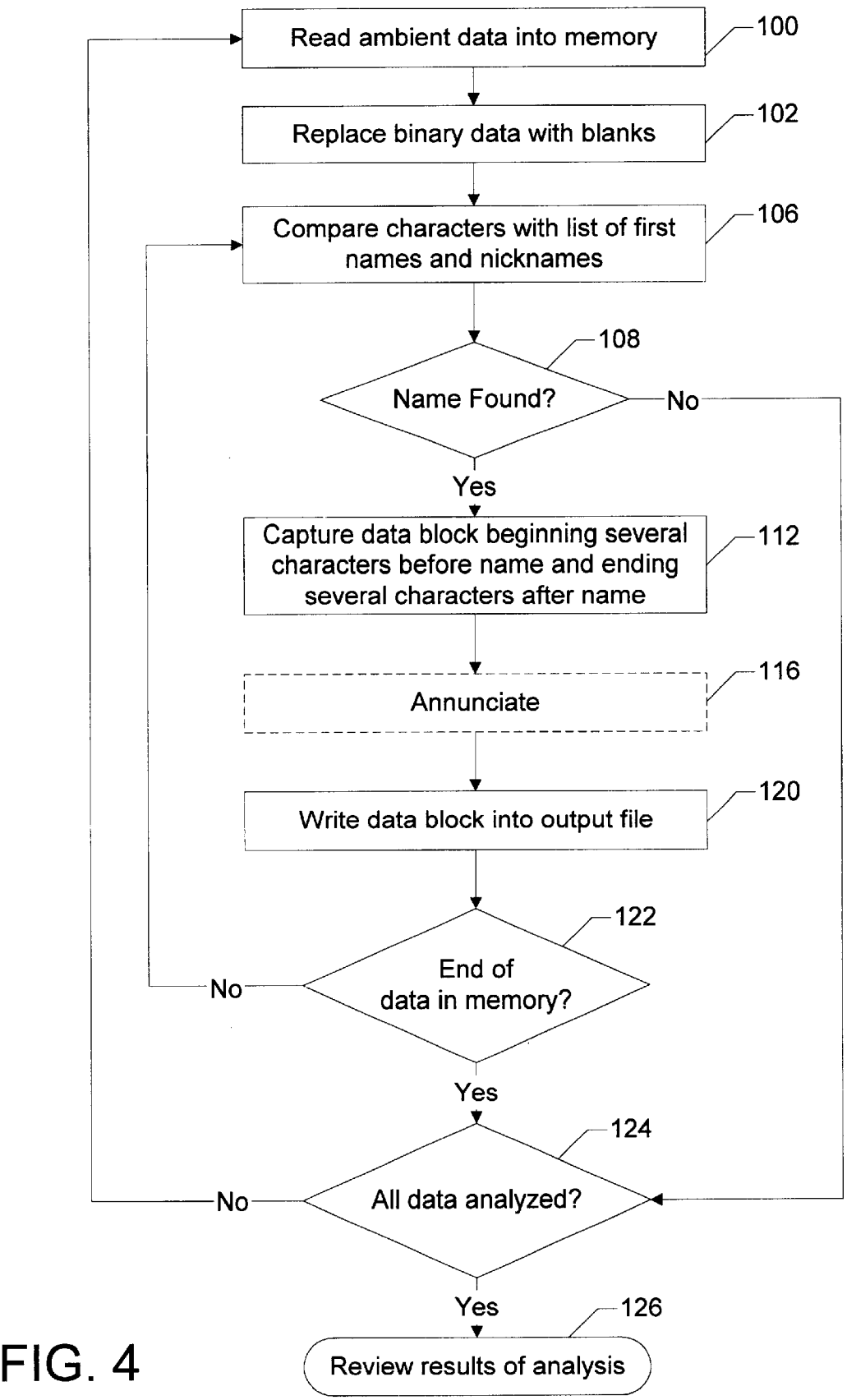
FIG. 4 is a flowchart showing the steps of a second embodiment of the present invention for finding names in ambient data.

FIG. 4 shows a second preferred embodiment of the invention as used to analyze ambient data. The method shown in FIG. 4 analyzes the ambient data to locate patterns that could correspond to names.

Step 100 shows that a portion of the ambient data, preferably 256 bytes, is read into memory. Step 102 shows that binary data is replaced with blanks. In step 106, the ambient data is searched to determine whether any names from a list of first names and nicknames are present in the data. If any of the names on the list are found in step 108, step 112 shows that a block of data surrounding the name, preferably 60 bytes, is defined. By saving characters both before and after the first name or nickname, the entire name is captured, regardless of whether the name is written with the last name first, the last name last, or with delimiters or initials before, after, or between the first and last names. Optional step 116 shows that the "hit" is announced to the investigator, preferably audibly. The block of text including the name is written to the output file in step 120.

Step 122 shows that if all the data in memory has not been analyzed, the analysis is continued from step 106. Step 124 shows that if either all the ambient data has been analyzed, the process is ended with step 126. Otherwise, additional ambient data is read into memory in step 100, and the process is repeated. Step 128 shows that the investigator reviews the results of the analysis.

Figure 5:
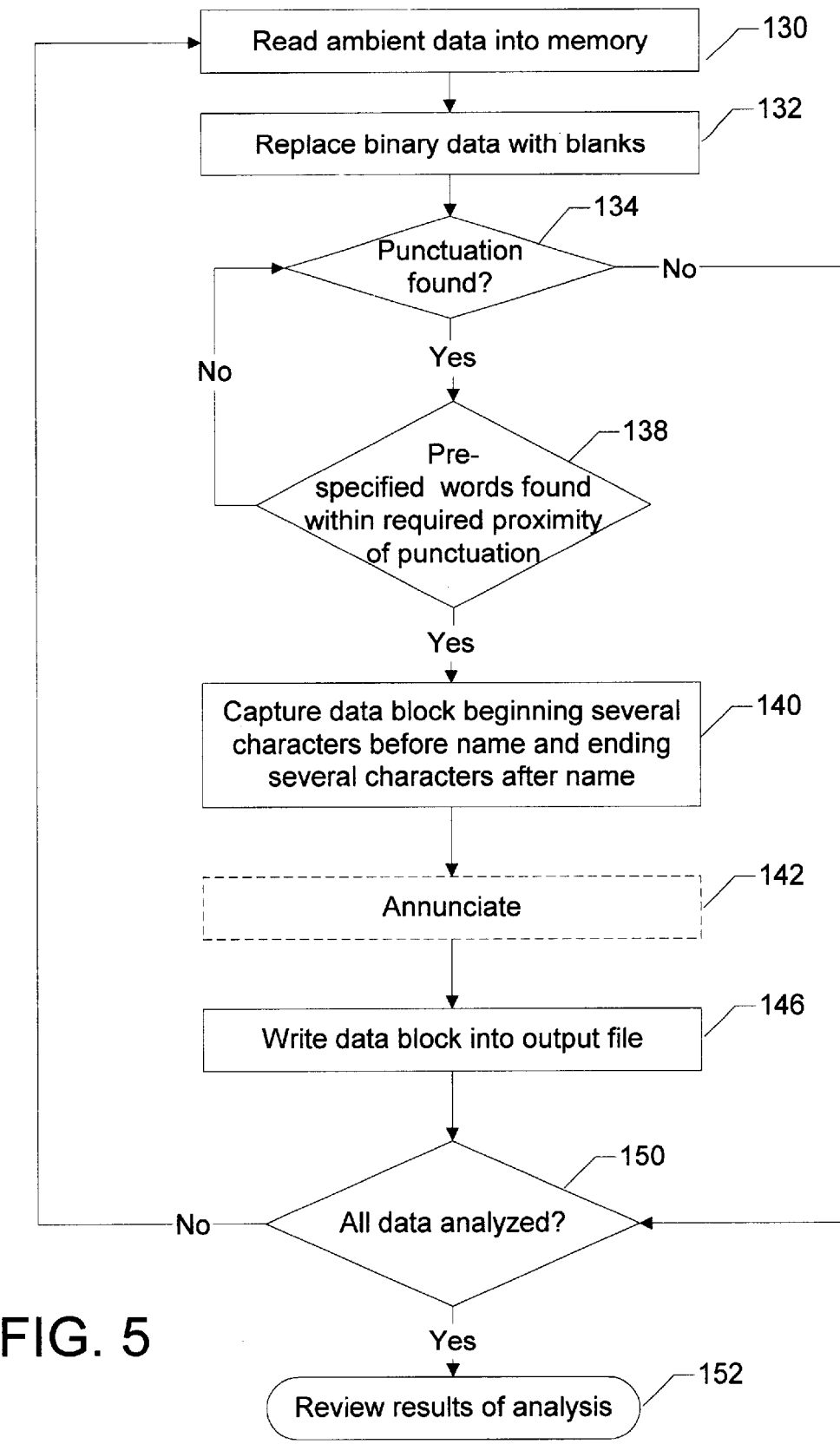
FIG. 5 is a flowchart showing the steps of a third embodiment of the present invention for finding English sentences in ambient data.

FIG. 5 shows a third preferred embodiment of the invention as used to analyze ambient data. The method shown in FIG. 5 analyzes the ambient data to locate patterns that could correspond to English language sentence structure.

Step 130 shows that ambient data, preferably 256 bytes, is read into memory and step 132 shows that the binary data is replaced with blanks. In step 134, the data is searched to detect the presence of any of the following punctuation marks: ",","."."?" or "!". If any of these punctuation marks are present, the data is compared in step 138 with a pre-compiled list of words that indicate subject matter that may be of interest to the investigator. If any of the words on the list are located within the same ambient data group as the punctuation mark, the presence of the punctuation along with the English word is a strong indicator that the data includes an English language sentence of interest to the investigator. If none of the words on the list are found within the required proximity to the punctuation mark, the analysis is continued with step 134, which locates the next punctuation mark in the data in memory.

Step 140 shows a block of data, preferably 60 bytes including the word and the punctuation mark, are defined. Step 142 shows that the "hit" is optionally announced to the investigator, preferably audibly. Step 146 shows that the block of information is written to the output file. The process of steps 134 to 146 are repeated on the data in memory until no more punctuation is found. Step 150 shows that if there is more ambient data to be processed, the process returns to step 130 and reads in more data. If all data has been processed, the results of the analysis are reviewed by the investigator at step 152.

Figure 6:
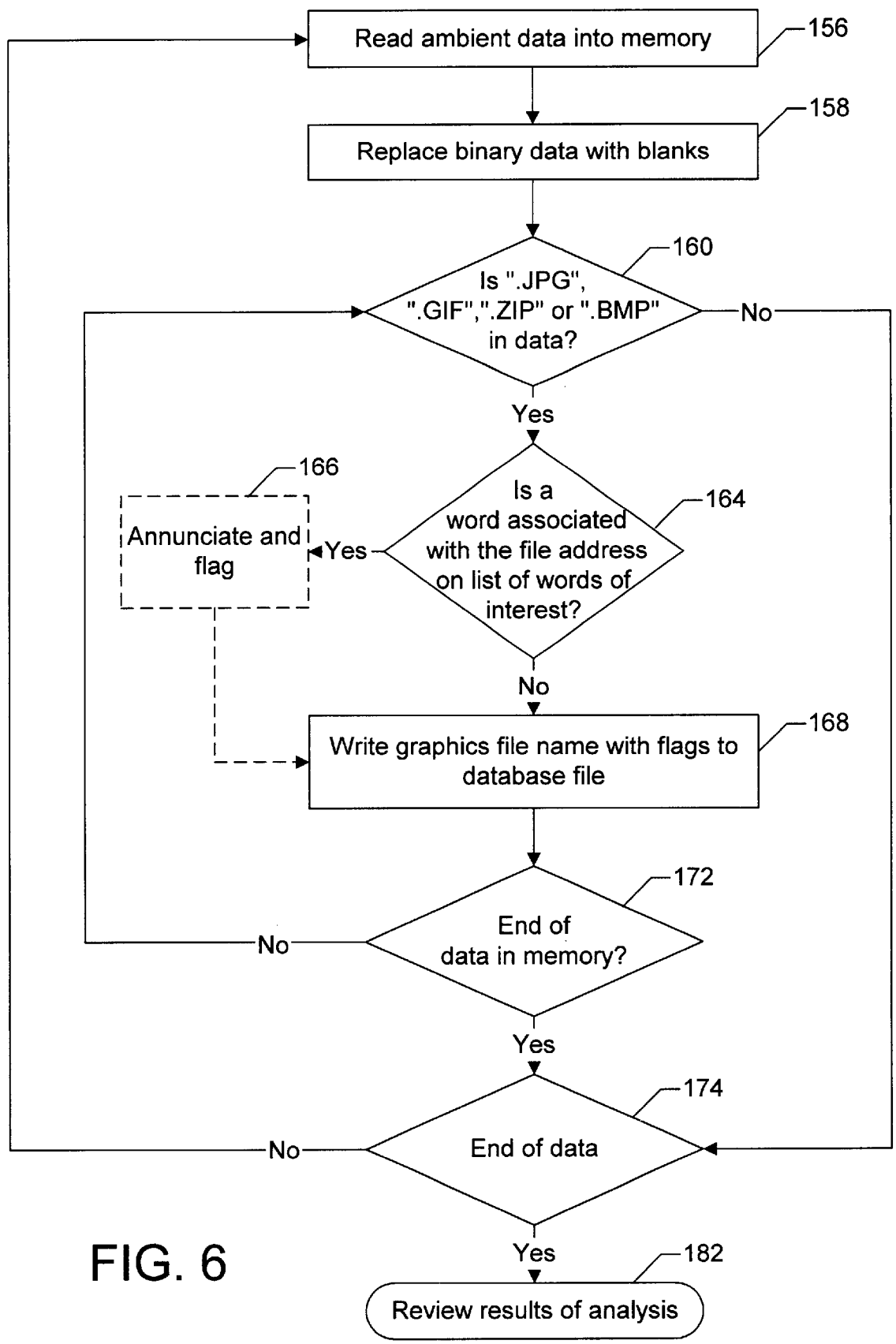
FIG. 6 is a flowchart showing the steps of a fourth embodiment of the present invention for finding graphics file names and compressed data file names in ambient data.

FIG. 6 shows a fourth preferred embodiment of the invention as used to analyze ambient data. The method shown in FIG. 6 analyzes the ambient data to locate patterns that could correspond to graphics or compressed data files that have been downloaded from the Internet.

Step 156 shows that a portion of ambient data is read into memory, preferably 256 bytes, and step 158 shows that the binary data is replaced with blanks. Step 160 shows that the ambient data is searched to locate a file extension indicating that a file of interest has been located.

Step 164 shows that the data is compared to a predefined list or lists of words of interest, for example, words pertaining to pornography or other criminal activity. If any of the words on the list or lists are located in the data, the hit is announced and flagged in step 166 as containing a word related to a particular list. In step 168, the file name is written to an output file, along with the flag that indicates the reason the URL was of particular interest. Step 172 indicates that if all the data in memory has not been analyzed, the analysis is continued from step 160 with the remaining data in memory. If all the data in memory has been analyzed, step 174 shows that if all the ambient data to be analyzed has not been analyzed, additional data is read into memory at step 156 and the process is continued. Otherwise, the analysis is complete and the investigator reviews the results of the analysis in step 182 process is ended at step 182.

Figure 7:
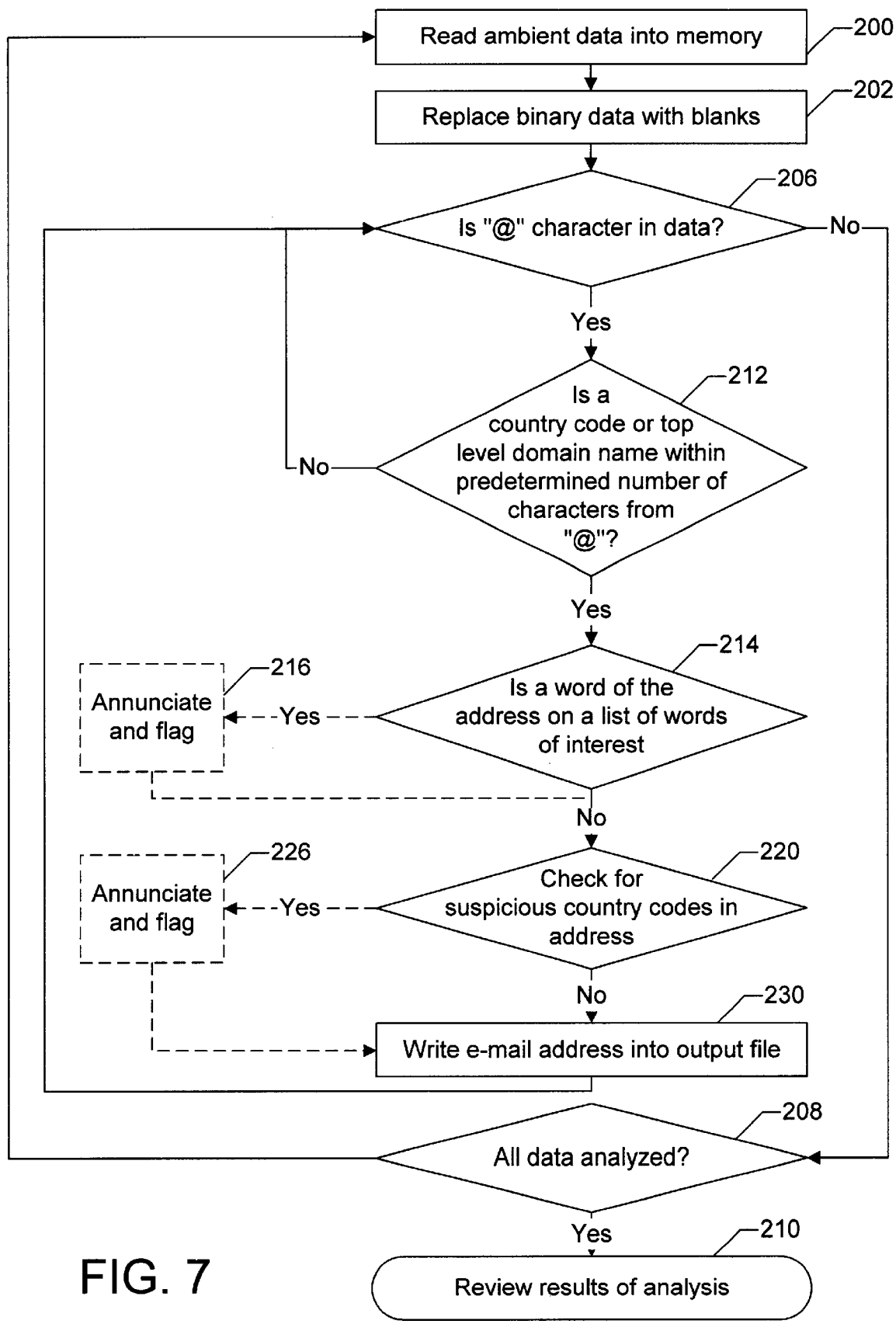
FIG. 7 is a flowchart showing the steps of a fifth embodiment of the present invention for finding e-mail addresses in ambient data.

FIG. 7 shows a fifth preferred embodiment of the invention as used to analyze ambient data. The method shown in FIG. 7 analyzes the ambient data to locate patterns that could correspond to Internet e-mail addresses that are not firewall aliases. Step 200 shows that ambient data is read into memory and step 202 shows that the binary data is replaced with blanks.

Step 206 shows that the program searches for the "@" symbol in the data. If the "@" is not located, it is assumed that there are no e-mail addresses in the data and step 208 shows that if there is no data to be analyzed, the process is ended at step 210. Otherwise, additional data is read in at step 200, and the process is repeated.

If the "@" symbol is located, the program checks in step 212 to see if any country codes or top level domain names are located within a specified number of characters, preferably 35, from the "@" sign. If no country codes or top level domain names are located within the specified distance, it is assumed that the "@" sign was not part of a e-mail address, or that the e-mail address was a firewall alias, and the data is searched to locate the next "@" symbol. Because firewall aliases typically have many embedded periods ("."s), another useful rule for excluding firewall aliases is to eliminate e-mail addresses that have greater than a maximum number, e.g. 7, periods between the @ sign and the country code or top level domain name.

If an e-mail address that is not a firewall alias is found, step 214 shows that the address is compared to a list of words of interest, such as words related to pornography. If a word of interest is located in the e-mail address, step 216 shows that an optional audible or visible signal is given to the investigator to alert him of possible evidence on the computer and the record in the output file is flagged announced to the investigator and flagged. Step 220 then shows that the country code is compared to a list of countries of interest. If the country code appears on the list, step 226 shows that an optional audible or visible signal is given to the investigator to alert him of possible evidence on the computer and the record in the output file is flagged as a suspicious country. The e-mail address, along with flagged information, is written to an output file in step 230.

The process is repeated from step 206 until all the data that was read into memory is analyzed. Step 210 shows that if there is additional, unanalyzed data, it is read into memory and analyzed. Step 212 shows that when all the ambient data has been analyzed, the investigator review the results of the analysis.

Figure 8:
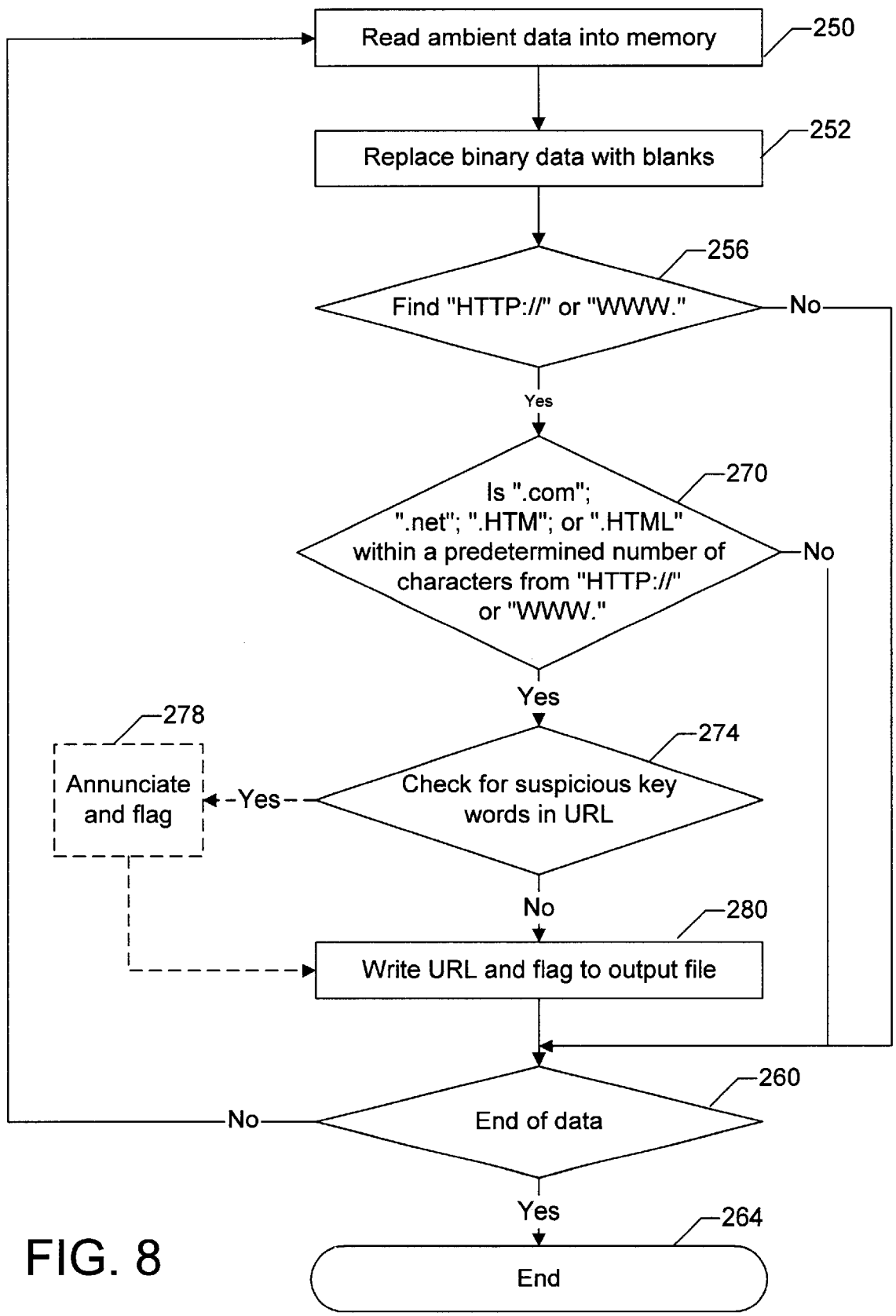
FIG. 8 is a flowchart showing the steps of a sixth embodiment of the present invention for finding URLs of interest in ambient data.

FIG. 8 shows a sixth preferred embodiment of the invention as used to analyze ambient data. The method shown in FIG. 8 analyzes the ambient data to locate patterns that could correspond to universal resource locators (URLs). The method of FIG. 8 is closely related to that of FIG. 7, and is preferably performed at the same time. The methods are shown separately in the interest of clarity. Step 250 shows that ambient data is read into memory and step 252 shows that the binary data is replaced with blanks.

Step 256 shows that the data is checked for the occurrence of the terms "HTTP://" or "WWW.". If neither of these terms appear, it is presumed that no URLs are present in the data and, if there is additional ambient data to be analyzed (step 260), it is read into memory in step 250.

If either of these terms does appear, step 270 shows that the data is checked for the occurrence of the terms ".HTM", ".Net",",HTM,"or ".HTML" within a predetermined number, preferably 35, of characters after the term "HTTP://" or "WWW."

If those terms occurrence in the required sequence and within the required proximity, the program assumes that the terms comprise a URL. In step 274, the URL is compared against a list of terms that could indicate activity of interest to the investigator. If the URL contains terms that match those on the list, the program optionally provides an audible or visible alert to the investigator in step 278. In step 280, the program also writes the URL into an output file, along with a code indicating which, if any, list contained a term in the URL. For example, a code could indicate that the list could contain words that suggest that the URL is a pornographic site. The process continues from step 256, searching for other occurrences of the search string in the data in memory. When the search strings are no longer found in the data in memory, step 260 shows that additional data, if available, is read into memory in step 250. When all the data has been analyzed, the investigator reviews the results of the analysis in step 264.

The output file can be customized to include only the specified sought-after features, such as names, English language words, phone numbers, or possible keyboard entered passwords. Alternatively, the output file could include all information having any probability of being useful.

The invention can be adapted for use with different computer systems, regardless of the word size. Thus, the invention can be used on 12 bit, 16, bit, 32 bit, or 64 bit machines.

Skilled persons will recognize that although each of the analyses above are described separately for ease of understanding, the analyses can be combined to reduce run time. Skilled persons will also recognize that it is possible to analyze file slack and unallocated space without collecting the data into a file. One could simply read in the information sequentially into memory and analyze it as it is read in.

The invention also includes a method for removing ambient data so that sensitive information is not available on media. The method overwrites all file slack, unallocated spaces, and Windows swap files with a repeated character, and allows the ambient data to be overwritten multiple times, so that minor variations in write head positioning will not leave traces of previous data.

Skilled persons will recognize that many other character patterns of vowels, consonants, numbers, punctuation, and symbols can be defined without departing from the principals of the present invention. The investigator can specify the information he is seeking, and the program will analyze for that type of feature and save those feature types to an output file. An investigator may also specify that no analysis is required, and that he desires only an output file with binary data removed so that he can manually review the data.

While preferred embodiments of the present invention has been shown and described, it will be apparent to those skilled in the art that many changes and modifications may be made without departing from the invention in its broader aspects. The invention is not limited to any particular pattern or patterns or to any form of output. Skilled persons will be able, from the information provided above, find other patterns that correspond to other information that they may seek in the ambient data. References above to the English language are not to be interpreted to limit the invention to any particular language, as skilled persons will recognize that similar patterns apply to related languages and skilled persons will be able to discern other patterns that apply to other language. The appended claims are therefore intended to cover all such changes and modifications as fall within the true spirit and scope of the invention.

What is claimed is:

1. A computer-implemented method of automatically extracting from a large ambient data file containing a mixture of textual data and binary data information that has a relatively high probability of corresponding to Internet-related activity of interest to an investigator, the method comprising:

providing an ambient data file including ambient data from one or more of the following sources, alone or in combination: unallocated storage space, file slack space at the end of one or more computer files, a windows swap, and one or more temporary system files;

reading a portion of the ambient data file into random access memory;

searching the portion of the ambient data to determine the presence of a first character or character group within a pre-specified proximity to a second character or character group to locate Internet-related identifiers of interest to the investigator;

if internet-related identifiers are located, copying the internet-related identifiers to an output file, thereby providing an output file for the investigator to review that excludes non-textual data, is greatly reduced in size from the original ambient data file; and that includes most or all of the internet-related information of interest to an investigator in the ambient data file.

2. The method of claim 1 in which searching the portion of the ambient data to determine the presence of a first character or character group within a pre-specified proximity to a second character or character group includes searching the portion of the ambient data to determine the presence the character "@" within a pre-specified proximity to an Internet country code or a top level domain name.

3. The method of claim 2 further comprising determining the number of periods between the "@" sign and the top level domain name and copying the Internet-related identifier to the output file only if the Internet-related identifier includes less than a pre-specified number of periods, thereby copying the Internet-related identifier only if it is unlikely to represent a firewall alias.

4. The method of claim 2 in which the second character or character group includes country codes from a list of countries of interest to the investigator.

5. The method of claim 1 in which searching the portion of the ambient data to determine the presence of a first character or character group within a pre-specified proximity to a second character or character group includes searching the portion of the ambient data to determine the presence of the characters "HTTP://" or "WWW." within a pre-specified proximity to an internet country code, a top level domain name, or the characters ".HTM" or ".HTML".

6. The method of claim 1 in which searching the portion of the ambient data to determine the presence of a first character or character group within a pre-specified proximity to a second character or character group includes searching the portion of the ambient data to determine the presence for characters identifying graphics or compressed files within a pre-specified proximity of words from a pre-compiled list of topics of interest to the investigator.

7. The method of claim 5 in which the characters identifying graphics or compressed files include the characters ".JPG", "GIF", ".ZIP"or ".BMP".

8. The method of claim 1 in which the Internet-related identifier includes e-mail addresses, universal resource locators, or file names.

9. The method of claim 1 in which the output file comprises a list of internet-related identifiers in a format readable by a commercial database application thereby facilitating determination of frequency of occurrence of the internet-related identifiers in the ambient data file.

10. The method of claim 1 in which the second character or character group includes words from a list of words related to activities of interest.

11. A computer-implemented method of reducing the amount of data requiring review by an investigator from a large ambient computer data file containing a mixture of textual data and binary data by eliminating non-textual data unrelated to Internet activity in a subject area of interest to the investigator, the method comprising:

searching the ambient data to locate a first character or group of characters;

searching the ambient data to locate a second character or group of character within a specified proximity to the first group of characters, the presence and proximity of the characters or character groups being indicative of Internet-related activity of interest to an investigator;

if the second character or group of characters is located within the specified proximity of the first character or group of characters, writing a portion of the ambient data including the first and second characters or groups of characters to an output file, thereby providing an output file for the investigator to review that excludes non-textual data, is greatly reduced in size from the original ambient data file, and that includes most or all of the internet-related information in the ambient data file and of interest to the investigator.

12. The method of claim 11 in which the output file is in a format readable by a commercial database application thereby facilitating the determination of frequency of occurrence of the internet identifier in the ambient data file.

13. The method of claim 11 in which the first character or group of characters includes the character "@" and in which the second character or group of characters includes an internet country code or a top level domain name.

14. The method of claim 13 in which searching the ambient data to locate a second character or group of character within a specified proximity to the first group of characters includes determining the number period between the "@" character and the country code or a top level domain name to prevent copying of firewall aliases to the output file.

15. The method of claim 11 in which searching the ambient data to locate a second character or group of character within a specified proximity to the first group of characters includes searching for words from a pre-compiled list of English language words related to topics of interest to the investigator.

16. The method of claim 11 in which the first character or group of characters includes the characters "HTTP://" or "WWW." and in which the second character or group of characters includes a top level domain name, an internet country code, or the file extension ".HTM" or ".HTML".

17. The method of claim 11 in which the first character or group of characters includes identifiers of graphics or compressed files.

18. The method of claim 11 in which searching the ambient data to locate a second character or group of characters includes searching the ambient data to locate top level domain names or country codes.

19. An apparatus for extracting from a large ambient data file containing a mixture of textual data and binary data information that has a relatively high probability of corresponding to an Internet-related activity of interest to an investigator, the method comprising:

data storage means including an ambient data file including ambient data from one or more of the following sources: unallocated storage space, file slack space at the end of one or more computer files, a windows swap, and a temporary system file;

random access memory for sequentially storing portions of the ambient data file;

means for searching the ambient data to locate a first character or group of characters;

means for searching the ambient data to locate a second character or group of characters within a specified proximity of the first group of characters, the presence and proximity of the characters being indicative of Internet-related activity of interest to an investigator;

means for copying information corresponding to the Internet related activity to an output file, thereby providing an output file for the investigator to review that is greatly reduced in size from the original ambient data file, that excludes non-textual data, and that includes most or all of the Internet-related information of interest to an investigator in the ambient data file.

20. The apparatus of claim 19 in which the means for searching the ambient data to locate a first character or group of characters includes means for searching for the character "@" and in which means for searching the ambient data to locate a second character or group of character within a specified proximity to the first group of characters includes means for searching for a top level domain name or a country code.

21. The apparatus of claim 20 in which means for searching the ambient data to locate a top level domain name or a country code within a specified proximity to the character "@" includes means to determine the number of periods between the character "@" and the top level domain name or a country code thereby excluding firewall aliases.

22. The apparatus of claim 19 in which the means for copying includes means for writing the output file is in a format readable by a commercial database application.

* * * * *